Figure 1:
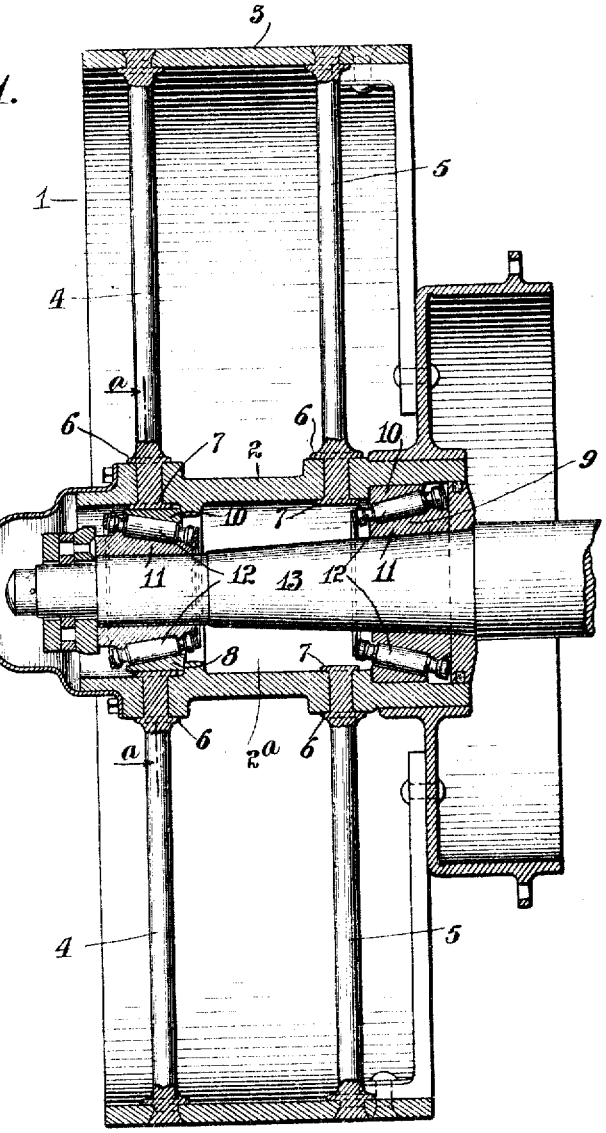

E. E. EINFELDT.
WHEEL.
APPLICATION FILED APR. 12, 1916.

1,211,422.

Patented Jan. 9, 1917
2 SHEETS—SHEET 2.

Attest:

Inventor:
E. E. Einfeldt
by Rogers Kennedy Campbell
Attys.

UNITED STATES PATENT OFFICE.

ERNEST E. EINFELDT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

WHEEL.

1,211,422.

Specification of Letters Patent.

Patented Jan. 9, 1917.

Application filed April 12, 1916. Serial No. 90,736.

*To all whom it may concern:*

Be it known that I, ERNEST E. EINFELDT, a citizen of the United States, residing at Davenport, in the county of Scott and State of Iowa, have invented certain new and useful Improvements in Wheels, of which the following is a specification, reference being had therein to the accompanying drawing.

This invention relates to metal wheels in which the spokes are rigidly fastened to the hub by heads or shoulders on the spokes formed usually by upsetting or riveting the same or by like operation. It is the common practice in the manufacture of wheels of this type to provide the hub with hollow spoke bosses to receive the spoke heads, the said bosses projecting outwardly from the spoke and forming local recesses or cavities in the hub communicating with the axial chamber therein. Wheels of this construction are frequently provided with two ranks of spokes; and for certain uses anti-friction bearings are mounted in the hub chamber. For the best results the two bearings should be spaced apart axially from each other a considerable distance in order to properly distribute the load on the axle; and to secure the greatest strength and bracing qualities of the spokes it is desirable also to space the two ranks axially a considerable distance from each other. This desirable disposition and relation of the bearings and ranks of spokes necessitates that one at least of the bearings be located in axial alinement with one of the ranks of spokes, but this disposition of the parts is impracticable because of the presence of the hollow spoke bosses and the consequent local cavities in the wall of the hub, the presence of such cavities rendering the hub unsuitable and unfit at this point to afford a sufficiently solid and effective support for the bearing ring of the antifriction bearing.

It is the aim of the present invention to overcome this objection and to provide a construction wherein the two ranks of spokes may be disposed the proper distance apart, and the two bearings also properly spaced and at the same time provide a firm and effective support for the bearing ring; and with this end in view I propose to dispense with the hollow spoke bosses and the incidental cavities heretofore employed and to so connect the spokes with the hub that their inner ends will project into the hub chamber, these projecting ends thus constituting conjointly a firm and effective supporting surface extending circumferentially around the interior of the hub, against which surface the bearing ring of the antifriction bearing may be seated and be given firm and solid support, with the bearing ring disposed in radial alinement with the spokes. In this way the full and desirable spacing of the two ranks of spokes and antifriction bearings for the best results may be secured.

I prefer to form heads on the projecting ends of the spokes, which heads may be flattened so as to produce a more extended and continuous support for the bearing ring, but it will be manifest that the invention is not limited in this respect the essence of which resides in utilizing the inner ends of the spokes as a support or seat for the antifriction bearing. It will be understood therefore that the invention is not limited to any particular form or construction of the parts except in so far as such limitations are specified in the claims.

Figure 2:
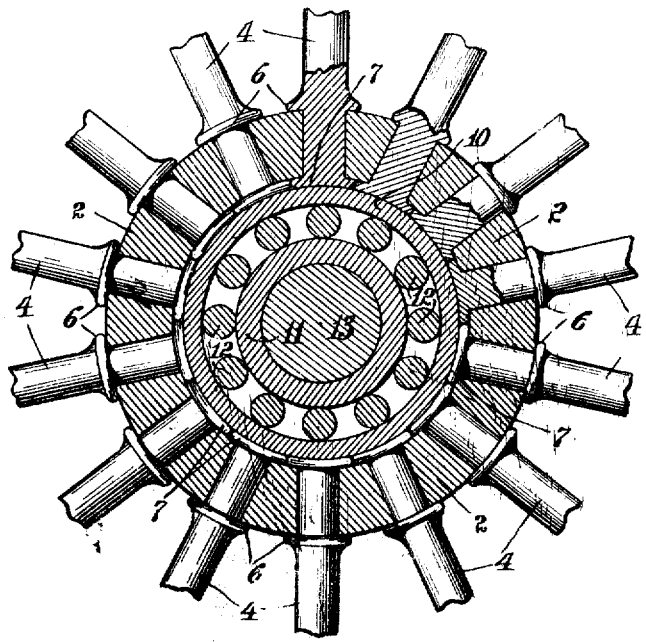

In the accompanying drawings: Figure 1 is a section taken axially through a wheel and hub having my invention embodied therein. Fig. 2 is a transverse section taken on the line $a$—$a$ of Fig. 1.

Referring to the drawings: 1 represents a wheel consisting of a hub 2 having the usual chamber 2ª, a rim 3, and two series or ranks of spokes, an outer rank 4 and an inner rank 5, which two ranks are fastened at their outer ends to the rim, and at their inner ends to the hub, and spaced from each other in an axial direction at their point of connection with the hub. The inner ends of the spokes extend through radial holes in the hub and are secured thereto in the present instance by shoulders 6 on the spokes bearing against the outer sides of the hub, and heads 7 on the inner end of the spokes, which heads project into the hub chamber and which are preferably flattened as clearly shown in Fig. 1. Situated within the hub chamber are two antifriction bearings, an outer bearing 8 and an inner bearing 9. These bearings comprise each an outer bearing ring 10, an inner bearing ring 11, and a series of interposed rolling elements in the form of bearing rollers 12, the inner bearing rings being mounted on an axle 13 projecting axially within the hub chamber.

The bearing ring of the outer bearing 8 is seated against and given firm support by the flat spoke heads 7, thus disposing the bearing in radial alinement with the spokes of this rank, and permitting the two ranks to be spaced from each other in an axial direction a sufficient distance to secure the full and greatest strength and bracing qualities of the spokes.

In the construction shown the inner bearing 9 is disposed inward of the inner rank of spokes, the outer bearing ring of said bearing being seated against the inner wall of the hub chamber at a point inward of the inner spokes.

As a result of the construction described, the two bearings are so separated from each other as to distribute the load on the axle under the most favorable conditions for effective operation; and the two ranks of spokes are likewise separated from each other a sufficient extent to secure the best and most effective results.

While in the foregoing description and accompanying illustration I have disclosed my invention in the particular form which I prefer to adopt and which in practice has been found to answer to a satisfactory degree the ends to be attained, it will be understood that various changes may be made in the details thereof without departing from the spirit of the invention, provided that the operation of the parts will be substantially as indicated above, the essence of the invention residing in supporting the antifriction bearing by the inner projecting ends of the spokes, so that the spokes and bearing may be disposed in alinement with each other, and the bearing given a firm and solid support within the hub.

Having thus described my invention, what I claim is:

1. In a wheel, the combination of a hub provided with an internal chamber, spokes connected fixedly with the hub and having their inner ends exposed within the chamber, and an antifriction bearing situated in the chamber and including an external bearing ring seated against and supported by said ends of the spokes.

2. In a wheel, the combination of a hub having an internal chamber, spokes connected rigidly with the hub and provided with heads extending in the chamber, and an antifriction bearing situated in the chamber and including a bearing seated against and supported by said spoke heads.

3. In a wheel, the combination of a hub provided with an internal chamber, spokes connected fixedly with the hub and provided on their inner ends with flat heads exposed within the chamber, and an antifriction bearing situated within the chamber and including a bearing ring seated against and supported by said flat spoke heads.

4. In a wheel, the combination of a hub provided with an internal chamber, spokes fixedly connected with the hub in two ranks spaced from each other in an axial direction, the inner ends of the spokes of one rank being provided with heads extending within the chamber, an antifriction bearing situated in said chamber in line with one of the ranks of spokes and including a bearing ring bearing against and supported by the heads on the spokes of said rank, and a second antifriction bearing situated in said chamber adjacent the other rank of spokes; whereby the two ranks of spokes and the bearings may be properly spaced from each other.

In testimony whereof, I have affixed my signature in presence of two witnesses.

ERNEST E. EINFELDT.